United States Patent
Tambini

(10) Patent No.: US 6,609,407 B1
(45) Date of Patent: Aug. 26, 2003

(54) TEST APPARATUS FOR A WRENCH USED TO TEST PREVIOUSLY TIGHTENED FASTENERS

(75) Inventor: Angelo Tambini, Wicklow (IE)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 57 days.

(21) Appl. No.: 09/707,047

(22) Filed: Nov. 6, 2000

(51) Int. Cl.$^7$ .......................... G01G 19/56; G01G 23/01
(52) U.S. Cl. .......................... 73/1.11; 73/1.12; 73/1.09; 73/862.21; 73/862.23
(58) Field of Search .............................. 73/1.11, 1.12, 73/1.09, 862.21, 862.23

(56) References Cited

U.S. PATENT DOCUMENTS

| | | | |
|---|---|---|---|
| 2,955,454 A | * 10/1960 | Husher | 73/1.11 |
| 3,274,827 A | * 9/1966 | Sturtevant | 73/862.23 |
| 4,150,559 A | 4/1979 | Levy | 73/1 C |
| 4,244,213 A | 1/1981 | Marcinkiewicz | 773/139 |
| 4,319,494 A | 3/1982 | Marcinkiewicz | 73/862.23 |
| 4,517,821 A | * 5/1985 | Taggart et al. | 73/1.11 |
| 4,558,601 A | * 12/1985 | Stasiek et al. | 73/862.23 |
| 4,589,289 A | * 5/1986 | Neuhaus | 73/862.23 |
| 5,734,113 A | * 3/1998 | Vogt et al. | 73/862.23 |
| 5,886,246 A | 3/1999 | Bareggi et al. | 73/1.09 |
| 6,318,189 B1 | * 11/2001 | Donaldson | 73/862.335 |

* cited by examiner

Primary Examiner—Daniel S. Larkin
Assistant Examiner—André K. Jackson

(57) ABSTRACT

A test apparatus includes a torque sensor that outputs an indication of torque when rotated by a tool to be tested, and an angle potentiometer that outputs an indication of the rotation angle. A rotatable arm is connected to the torque sensor. A stop prevents the arm from rotating past a rest position. At least one of the group consisting of the arm and the stop includes a magnet. The magnet causes a magnetic force that attracts the arm toward the rest position when the arm is at or near the rest position, simulating static friction. At least one elastic member, which may be a spring, urges the arm toward the rest position.

23 Claims, 6 Drawing Sheets

TEST APPARATUS FOR A WRENCH USED TO TEST PREVIOUSLY TIGHTENED FASTENERS

FIELD OF THE INVENTION

The present invention relates generally to test equipment, and more specifically to a test device for a wrench.

DESCRIPTION OF THE RELATED ART

Threaded fasteners are tightened by a wide variety of tools and control techniques. To ensure quality of fastened joints, an inspection may be performed periodically to ensure that the tools used to perform the tightening continue to apply the correct torque. This "audit" is typically performed on pre-tightened joints using dial wrenches, indicator wrenches and electronic wrenches to check the torque required to rotate a fastener by a small amount. The torque read from the wrench is related to the initial tightened torque.

A number of factors may introduce variance into the torque readings. These may include, for example, variations in friction, the accuracy of the current torque reading, the original torque prior to the current reading, and operator error. These sources of variance may introduce so much scatter in the actual torque values that the performance of the tool is obscured. It is desirable to establish a test technique to determine which audit method and tool provides the best performance.

U.S. Pat. No. 4,244,213 and 4,319,494 are incorporated by reference herein in their entireties, for their teachings on measurement of torque previously applied to fasteners.

U.S. Pat. No. 4,150,559 and 5,886,246 describe test devices for tools. These test devices simulate joint conditions, but do not simulate pre-tightened joints.

Optimally, a repeatability and reproducibility test is conducted. In testing the tool, it is desirable to present multiple appraisers with the same test condition, so that the effect of operator influence on the test results can be measured. Unfortunately, it is difficult to exactly duplicate the condition of a threaded joint because each time a joint is disturbed, the friction conditions change.

A test apparatus is desired that can reliably repeat a given test condition, and is adjustable to simulate a variety of joint conditions, joint stiffnesses, degrees of stick-slip, and breakaway torque.

SUMMARY OF THE INVENTION

A test device includes a torque sensor that outputs an indication of torque when rotated by a tool to be tested. A rotatable arm is connected to the torque sensor. A stop prevents the arm from rotating past a rest position. At least one of the group consisting of the arm and the stop includes a magnet. The magnet causes a magnetic force that attracts the arm toward the rest position when the arm is at or near the rest position. At least one elastic member urges the arm toward the rest position. A piston optionally forces the tool to apply a torque at an adjustable repeatable application speed.

DETAILED DESCRIPTION

Figure 1:
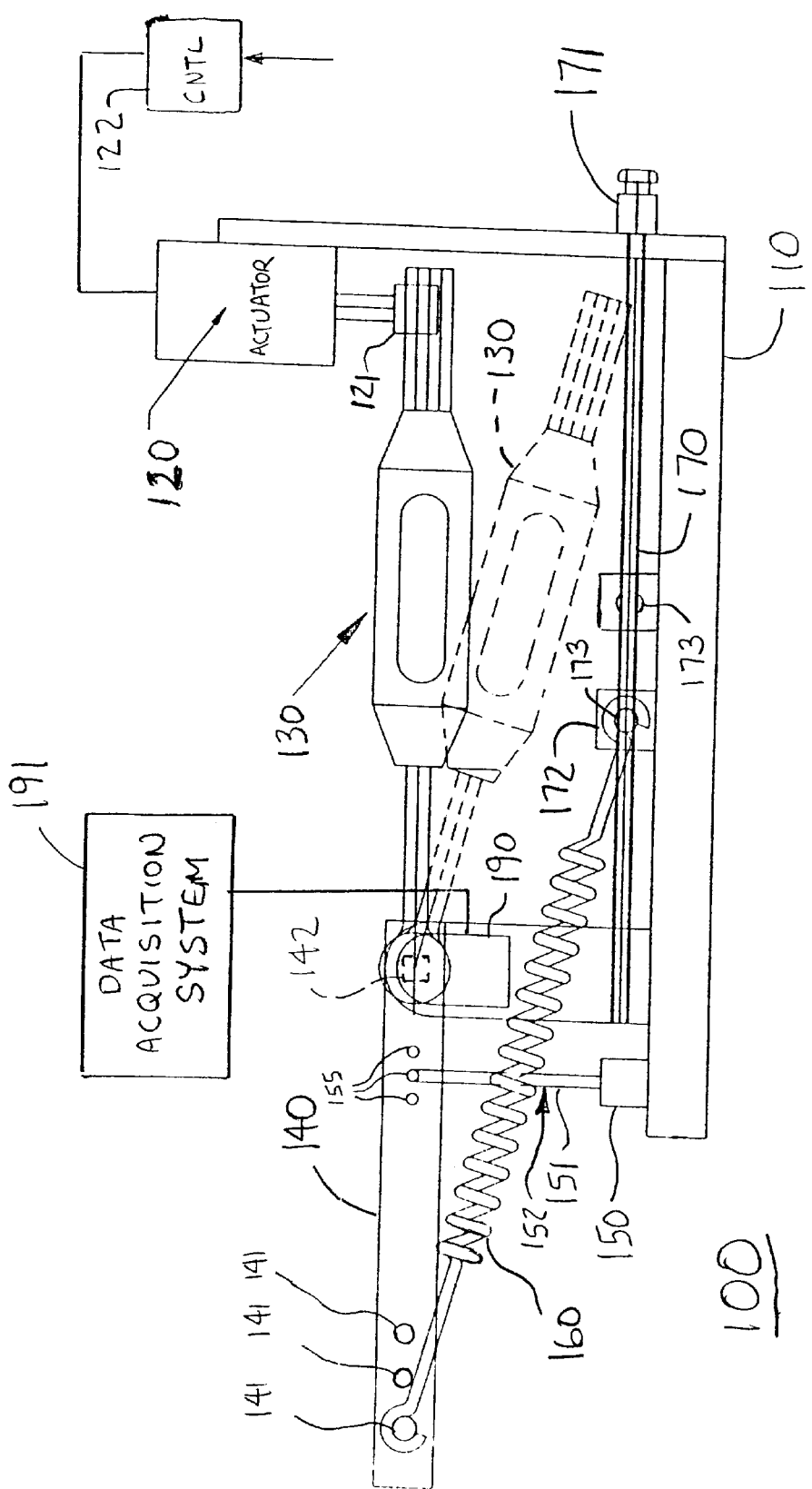
FIG. 1 is a front elevation view of a first exemplary apparatus according to the present invention.
Figure 2:
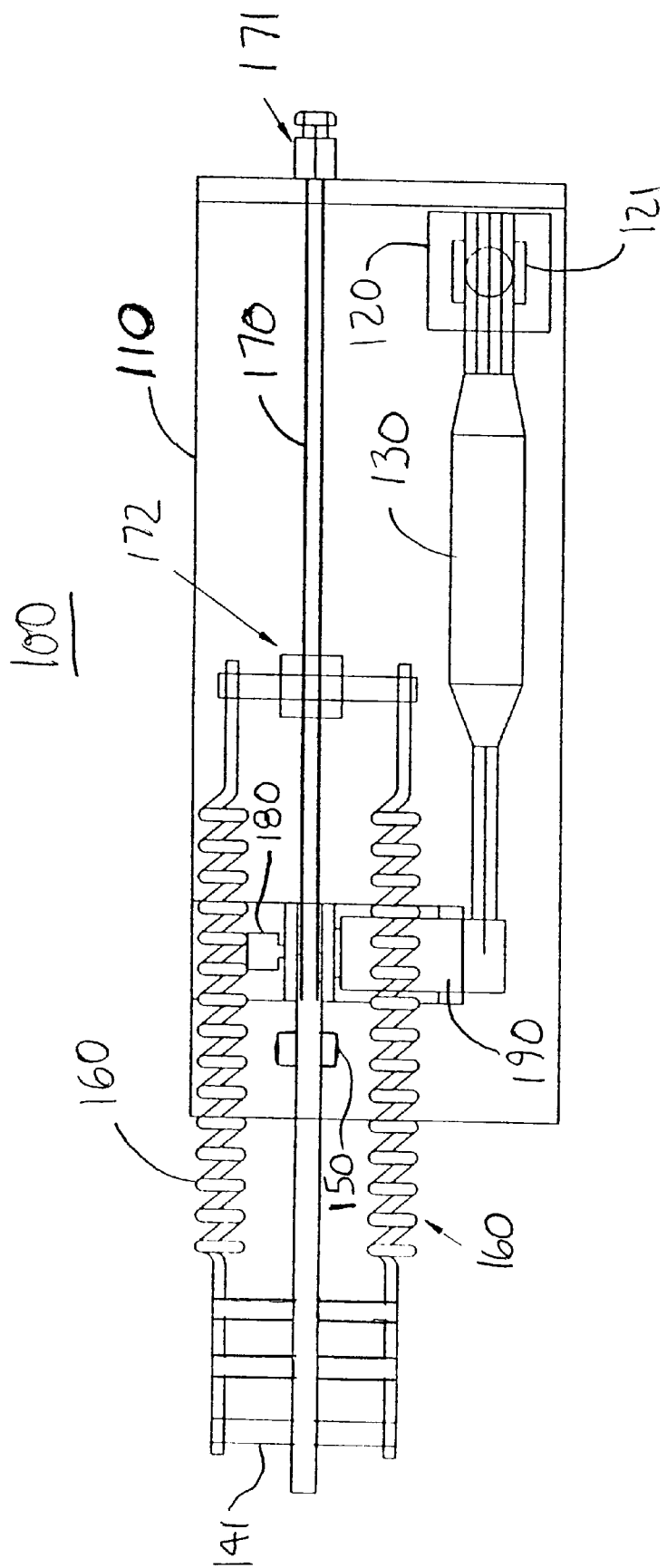
FIG. 2 is a top plan view of the apparatus of FIG. 1.
Figure 3:
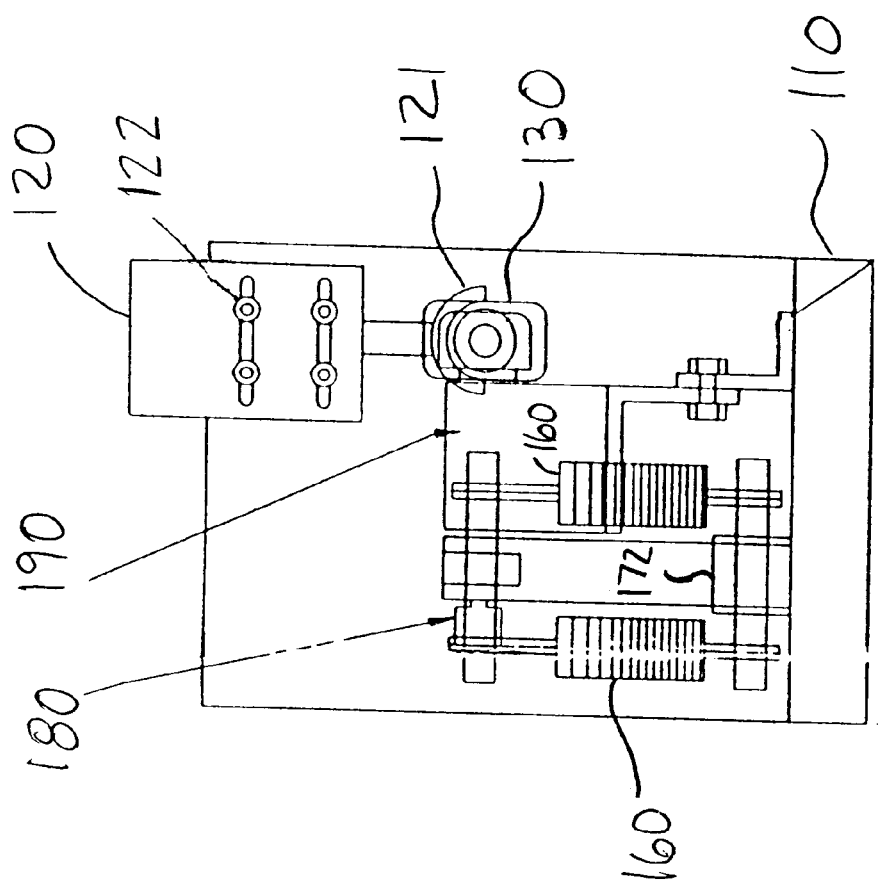
FIG. 3 is a left side elevation view of the apparatus shown in FIG. 1.

FIGS. 1–3 show a first exemplary test apparatus 100 according to the present invention. The exemplary embodiment is designed to simulate the break-forward torque of a previously tightened bolt (or other fastener) in a controlled, repeatable manner. The exemplary embodiment allows the setting and adjustment of the following parameters:

1) Break forward torque;
2) "Torque rate" defined as the increase in torque per degree (or radian) of rotation for a given spring, after movement begins; and
3) The initial momentary torque peak (local maximum) value required to overcome static friction or other factor tending to inhibit motion (e.g., rust, paint or adhesive substance used to retain the fastener, such as "LOCTITE" brand adhesive).
4) Rate of application of force to the tool under test.

The test apparatus 100 has a base 110. Two sensors are attached relative to the base 110. An in-line torque sensor 190 outputs an indication of torque when rotated by a tool 130 to be tested. An exemplary torque sensor 190 is the TW4 200 Nm torque transducer manufactured by the Hottinger Baldwin Messtechnik (HBM) GmbH, of Darmstadt, Germany, but other torque transducers having a similar range (or any desired range) may be used.

A rotatable arm 140 is connected to the torque sensor 190. The arm has a standard drive 142, such as a ½ inch (1.27 cm) square drive, by which the tool 130 to be tested can rotate the arm. The arm 140 pivots about an axis that coincides with the position of the drive 142. The tool 130 connects through the torque transducer 190 to the square drive 142 of the arm 140. Preferably, the arm 140 includes a plurality of studs 141 or other suitable mountings for springs 160, as described further below.

The apparatus includes means for measuring an angle of rotation of the arm 140. For example, an angle potentiometer 180 may be used to output a signal indicating the angular position of the arm 140. A power supply (not shown) and readout (such as a digital multimeter or data acquisition system, not shown) provide power to, and read the output from, the angle potentiometer 180. The resistance of the potentiometer may be, for example, about five K-ohms.

Data from the angle potentiometer 180 and the in-line torque sensor 190 are collected by a data acquisition system 191, which may be external to the apparatus 100. Preferably, the data acquisition system 191 also measures and stores the length of time during which the arm 140 is rotated during each trial as a further test variable.

The apparatus includes means for preventing the arm 140 from rotating past a rest position. In the embodiment of FIG. 1, the means for preventing includes a stop 152 that prevents the arm 140 from rotating past the rest position shown in FIG. 1. In the exemplary embodiment, the stop 152 includes an additional arm 151 attached to the arm 140.

The apparatus includes biasing means for applying a bias force to urge the arm 140 toward the rest position shown in FIG. 1. The bias force has a local maximum when the arm 140 is displaced by a non-zero angle from the rest position.

The exemplary biasing means includes at least one elastic member, which urges the arm 140 toward the rest position. In the example, the at least one elastic member is a pair of springs 160, which apply a downward force on the arm 140 without twisting the arm about its axis. The exemplary springs all have the same length when they are not loaded, to facilitate attachment to the apparatus 100 while the arm 140 is in the rest position.

It is understood that a single spring 160 may be used. For example, a single spring directly beneath the centerline of the arm 140 could also exert a downward force on the arm 140 without twisting the arm about its axis. As an alternative to springs, other elastic members are contemplated. For example, heavy bands of an elastomeric material, such as natural or synthetic rubber (not shown), may be used. As another alternative to linear springs, torsion springs may be used.

The biasing means further includes an element that provides an additional biasing force when the arm 140 is at or near the rest position. For example, at least one of the group consisting of the arm 140 and the stop 152 may include a magnet 150. In the exemplary embodiment of FIG. 1, the magnet 150 is attached to the bottom end of the additional arm 151 of stop 152.

The magnet 150 meets the base 110 when the arm 140 is in the rest position. The magnet 150 causes a magnetic force that attracts the arm 140 toward the rest position when the arm is at or near the rest position. The magnetic force falls off rapidly as the arm 140 rotates away from the rest position.

The exemplary magnet 150 is a permanent magnet. Optionally, an electromagnet may be used. One of ordinary skill in the art can readily provide for optimal control of the electro-magnet based on position information from the angle potentiometer 180. As an alternative method of varying the magnetic force, the position of the permanent magnet 150 may be adjustable as described below.

In addition to varying the spring position and angle, the position of magnet 150 may also be varied. For example, as shown in FIG. 1, the magnet may be detachably mounted to any of the studs 155 on the arm 140. By changing the mounting position, the lever arm at which the magnet force is applied to the arm 140 changes. Thus, the breakaway torque is greatest when the magnet 150 is suspended furthest from the fulcrum of arm 140, and smallest when the magnet 150 is suspended closest to the fulcrum.

The apparatus includes means for adjusting the biasing means. For example, to simulate a variety of conditions, a variety of different springs 160 may be used, so that an amount of pre-tension in the elastic member at the rest position is adjustable. For each spring, the spring position and angle (in the rest state) may be adjusted by using a different one of a plurality of mounting studs (two studs 173 are shown in FIG. 1, but any number may be provided) for attaching the spring. Alternatively, the spring position and angle may be varied by using a different one of a plurality of studs 141 on the arm 140. Each spring provides a different combination of break-forward torque and torque rate. Data can be collected for any given tool using a plurality of different springs and/or spring angles.

The exemplary elastic member 160 also has a fine adjustment 171. For example, the spring 160 may be attached to a movable shaft 170 having a threaded end. Rotating an adjustment nut 171 to advance the movable shaft 170 to the left decreases the tension in the spring 160. Conversely, rotating the adjustment nut 171 to retract the movable shaft 170 increases the tension in the spring 160. Using this configuration, with the elastic member 160 connected directly to the movable shaft 170, the length of the elastic member is measurable by determining the position of the shaft. By fitting a mechanical counter to the adjustment nut 171 or placing markings on the shaft, the position of the shaft can be easily read (and the tension in the spring in the rest position readily calculated), and the spring settings can be repeated.

The apparatus preferably further includes means for actuating the tool 130 to be tested, to rotate the arm 140 away from the rest position. In the exemplary embodiment, a conventional mechanical actuator 120 moves the tool 130 to be tested, to rotate the arm 130 away from the rest position. The actuator may be pneumatically or electrically powered. Preferably, the speed of the actuator 120 is adjustable. A collar 121 may be attached to the end of the actuator, to positively grip the tool 130. In one stage of the test the actuation needs to be automated to establish a baseline performance. A second stage of the test is operated manually with multiple operators presented to establish resilience of tool performance to operator influence.

Other mechanical or electromechanical devices may be used to actuate the tool 130 during testing. For example, a rotating motor (not shown) may be provided, and the tool 130 may be coupled to the motor by way of a chain and gears (not shown), a belt and a pulley, or other conventional drive. Rotation of the motor is translated into linear motion of the tool 130.

Figure 4:
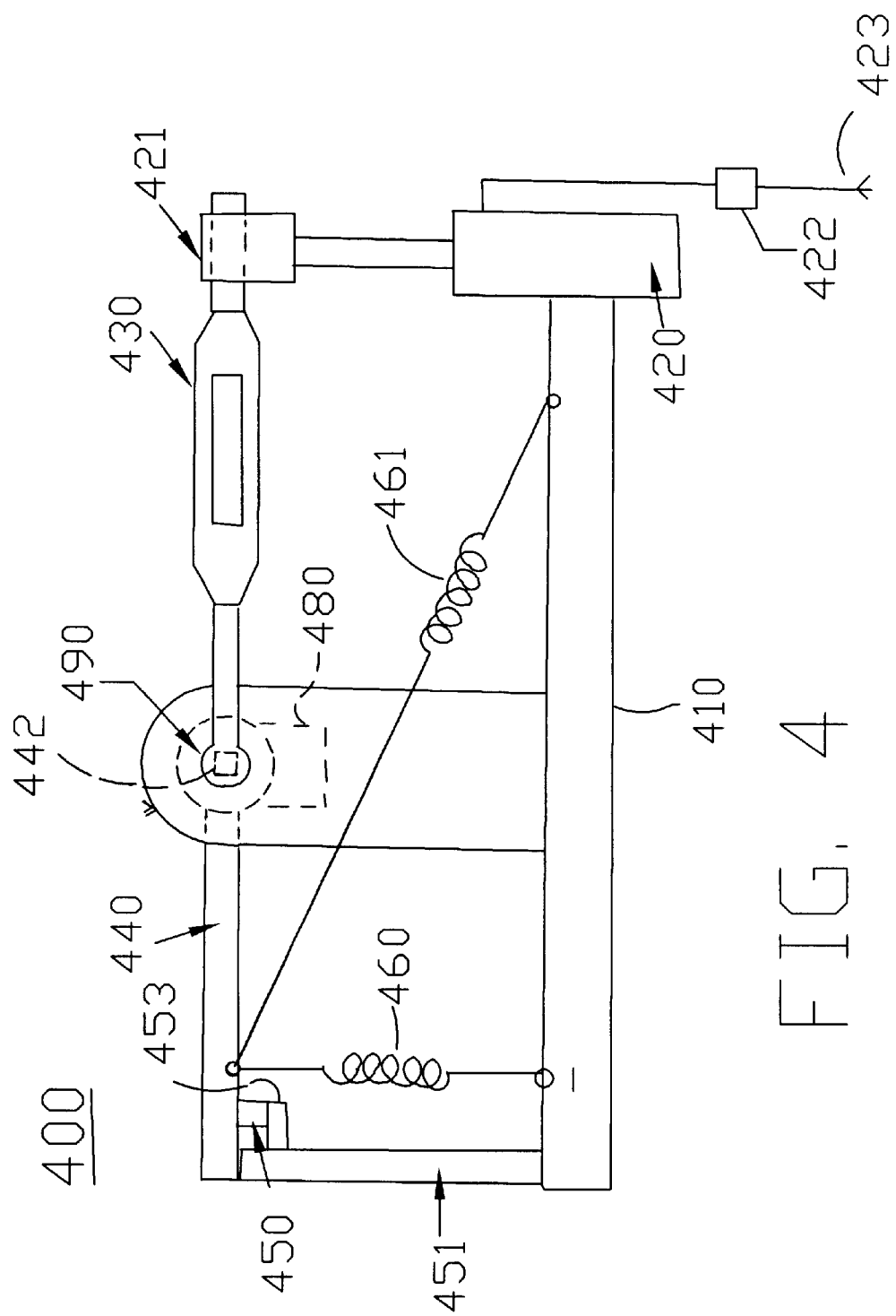
FIG. 4 is a front elevation view of a second exemplary apparatus according to the present invention.

FIG. 4 shows a second exemplary apparatus 400 according to the invention. Test apparatus 400 includes a torque sensor 480 that outputs an indication of torque when rotated by a tool 430 to be tested. A rotatable arm 440 is connected to the torque sensor 480. An angle potentiometer 490 outputs a signal indicating the angular position of the arm 440. A stop 451 prevents the arm 440 from rotating past a rest position, shown in FIG. 4. In this embodiment, the arm 440 includes the magnet 450. The magnet 450 causes a magnetic force that attracts the arm 440 toward the rest position when the arm is at or near the rest position.

In the embodiment of FIG. 4, the means for preventing rotation includes a stop 451, and the rest position is shown in FIG. 4. In apparatus 400, the stop 451 includes an additional arm 451 attached to the base 410. The magnet 450 is attached to the arm 440. The additional arm 451 has an extension member 453, which is formed of a permanent magnet or a ferric material that is attracted to the magnet 450. The magnet 450 is in contact with the arm 440 and the extension member 453 of the additional arm 451 when the arm 440 is in the rest position.

Although the example of FIG. 4 shows the magnet 450 contacting an extension member 453 of the additional arm 451, other variations are contemplated. For example, in one variation (not shown), the additional arm 451 may be positioned directly beneath the magnet 450, and the additional arm 451 may be made of a magnet or a ferric material, in which case the extension member 453 may be omitted. In this variation, the magnet 450 directly contacts the arm 440 and the additional arm 451 when the arm 440 is in the rest position.

In another variation (not shown) of the embodiment of FIG. 4, the arm 440 is shortened, so that the magnet 450 contacts extension member 453 without any direct physical contact between the tip of arm 440 and the additional arm 451.

In the embodiment of FIG. 4, the biasing means includes two elastic members to urge the arm 440 toward the rest position. The exemplary elastic members 460, 461 are springs. Either or both of the springs 460, 461 may be varied to simulate different torque conditions. Further, the position and angle of each spring may be varied in the manner described above with reference to FIG. 1.

The actuating means of FIG. 4 includes an air powered cylinder 420 with an air flow control 422. The air flow control 422 is connected to a pneumatic supply line 423.

CALIBRATION

Exemplary methods for using the above-described apparatus to test a tool are described below. Although reference is made to the apparatus of FIG. 1, the exemplary method may be used with other variations of the invention.

Because the resistance of potentiometer 180 varies in proportion to how much it is turned, the potentiometer can measure angle well if it is coupled rigidly to the rotating arm 140 of the fixture 100. To measure angle from the potentiometer voltage signal, potentiometer 180 is calibrated. A known sweep of angle has a fixed change in resistance and therefore a fixed change in voltage signal. Calibration of the potentiometer is as follows:

1. The angle potentiometer 180 is connected such that a proportional voltage signal is measured from the Data Acquisition system 191, ensuring that the jam nuts that couple the potentiometer to the rotating arm shaft are tight.
2. The break-away magnet 150 and springs 160 are removed from the fixture 100.
3. An external angle measurement device (not shown) is fixedly connected to the square drive 142 of the arm 140.
4. The arm 140 is moved to the outside mechanical stop, and a voltage reading. (Vi) is recorded.
5. The arm 140 is moved to the inside mechanical stop, and a voltage reading. (Vf) is recorded.
6. An angle measurement θ is taken (using the external angle measurement device) for the entire sweep from the outside to the inside stop. Alternatively, a known angle corresponding to the maximum range of movement of the arm may be swept.
7. The gain is calculated using θ/ (Vf−Vi). For example, in the exemplary procedure, the gain was calculated over two sets of 36 samples. The scatter of the gain was calculated for each of the 72 data points as a percentage of the mean to be 2.36%. In addition to determining gain, a statistical test was applied to determine whether there was a significant difference between the first and second groups of samples.

Magnet consistency may be calibrated by the following procedure:

1. The break-away magnet 150 is assembled to one of the positions on the fixture 100.
2. The joint springs 160 are removed.
3. A breaker bar or wrench is assembled through torque transducer 190 to the square drive 142 in the arm 140.
4. The angle potentiometer 180 and the torque transducer 190 are assembled to the data acquisition system 191.
5. The air cylinder actuator 120 is set for a medium angular speed with a flow control device located upstream of the supply air to the air cylinder control valve 122, i.e. one that might be used to audit fasteners.
6. Using the cylinder control valve 122, the wrench 130 or breaker bar is actuated and the peak torque and matching angle data are acquired for 15–30 break-away cycles of the fixture with no change of fixture set-up in between each cycle.
7. The magnet 150 is moved to the next position and the acquisition is repeated.

Joint Simulation Consistency is tested, to show that the appropriate range of torque (e.g., from 20 or 30 Newton-meter (Nm) to 80 or 90 Nm torque, with torque rates from 0.5 Nm/degree to 2.0 Nm/degree) is covered and how consistently the fixture operates with the different set-up configurations.

1. The spring shaft 141 (located on the arm 140) is moved to the desired hole.
2. One of the sets of springs 160 is assembled to the fixture 100 and the spring 160 is tightened to the desired tension (counter setting).
3. The wrench 130 is connected through the torque transducer 190 to the square drive 142 of the arm 140.
4. The position of the actuating air cylinder 120 is adjusted over the handle of wrench 130, such that the cylinder is in line with the motion of the wrench and rests about ½ to 1 inch above the handle of the wrench.
5. The flow control 122 is set so that the speed of the actuating cylinder 120 is about as fast as a normal torque audit would be
6. The wrench 130 is set to the desired auditing set-up parameters and is reset using the proper reset procedure.
7. The audit cycle is started by actuating the control until the wrench indicates that an audit value has been found. When an audit has been found, the control is released.
8. During the audit cycle, torque data are acquired from the external torque transducer and angle data are acquired from the Potentiometer. In addition to the audit and peak torque readings from the wrench, the following values are acquired for each cycle: Local maximum and minimum torque and angle and overall maximum torque and angle. Overall maximum torque is the maximum torque achieved in the cycle.
9. The breakaway cycle data acquisition is repeated 25 times without changing the set-up between cycles and between wrenches that are being compared. This ensures the maximum repeatability of the fixture and the best allowable comparison between wrenches and/ or wrench settings.

The tool 130 is mounted on the apparatus 100. The actuator 120 is adjusted so that the rest position allows enough clearance for the tool 130 to be lifted by the handle, to remove the torque generated by its own weight (for example, about 1.27–2.5 cm, or 0.5–1.0 inch). This allows the tool 130 to be reset.

A method of statistical comparison is applied to the analysis of the groups of calibration samples. On most of the data tabulations, appropriate statistical measures may include the mean, standard deviation and the six-sigma scatter (as a percentage of the mean).

Figure 6:
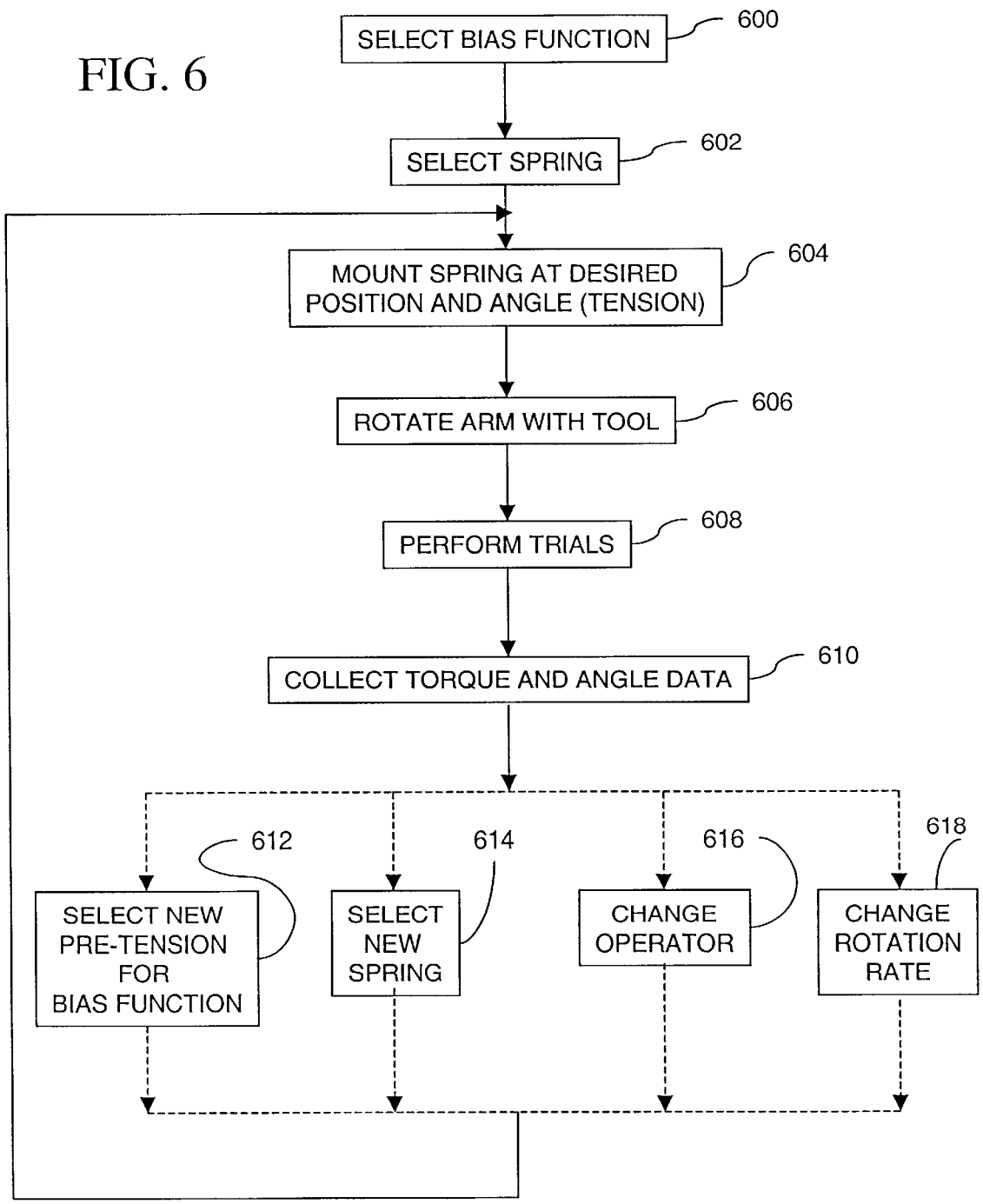
FIG. 6 is a flow chart diagram of an exemplary method for operating the exemplary apparatus shown in FIG. 1.

FIG. 6 is a flow chart diagram of an exemplary calibration method.

At step 600, a first bias function is selected, including the determination of the pre-tension and the stiffness of a spring to be used.

At step 602, a spring 160 is selected with the desired stiffness.

At step 604, the spring 160 is mounted on the fixture 100, with the ends of the spring at the desired location and the angle of the spring set (by selection of the mounting position and/or adjustment of the fixture), so as to provide the desired pre-tension and torque profile.

At step 606, the arm 140 of the fixture 100 is rotated with a tool 130.

At step 608, a desired number of trials are performed.

At step 610, torque data and rotation angle data are collected.

After step 610, any of steps 612–618 may be performed to collect further data. At step 612, a new pre-tension is selected, corresponding to a different zero-rotation length of the spring 160. At step 614, a new spring is selected. At step 616, a different operator performs a set of trials. At step 618, the rotation rate of the arm 140 is changed. Once one of the four parameters is changed at step 612, 614, 616 or 618, steps 604–610 are repeated, to collect additional data.

OPERATION

Before conducting an audit, a bias force function is selected. For emulating a previously tightened fastener, the bias force function has a non-zero value when the arm 140 is at the rest position, and varies with the position of the arm. In the exemplary embodiment, the bias force function is implemented by the choice of a spring, and the selection of the spring's pre-tension, determined by the spring's tension (or extension) in the rest position, where the rotation angle of the arm 140 is zero. A spring 160 is selected and attachment studs 141, 173 are selected. The spring 160 is attached to the arm 140 and base 110 (or to the arm and an adjustment shaft 170) at a selected location. The no-load length of the spring 160 in the rest position is adjusted, by varying the spring position and/or varying the position of the shaft 170 (if present). If the adjustment mechanism 171 has a counter, the counter is reset at zero. The amount by which the length of the spring 160 is adjusted is measured. One of ordinary skill recognizes that the spring constant and the spring angle both affect the torque rate of the apparatus 100.

By varying the spring angle, the apparatus may be set at the "changeover point" for any spring combination. The "changeover point" is defined as the point at which the torque remains constant with increasing angle, and then begins to decrease if the rotation angle is increased further. This point depends on the no-load length and spring constant of the spring. With the spring 160 in place, a bias force is applied to urge the rotatable arm 140 toward the rest position.

Figure 5:
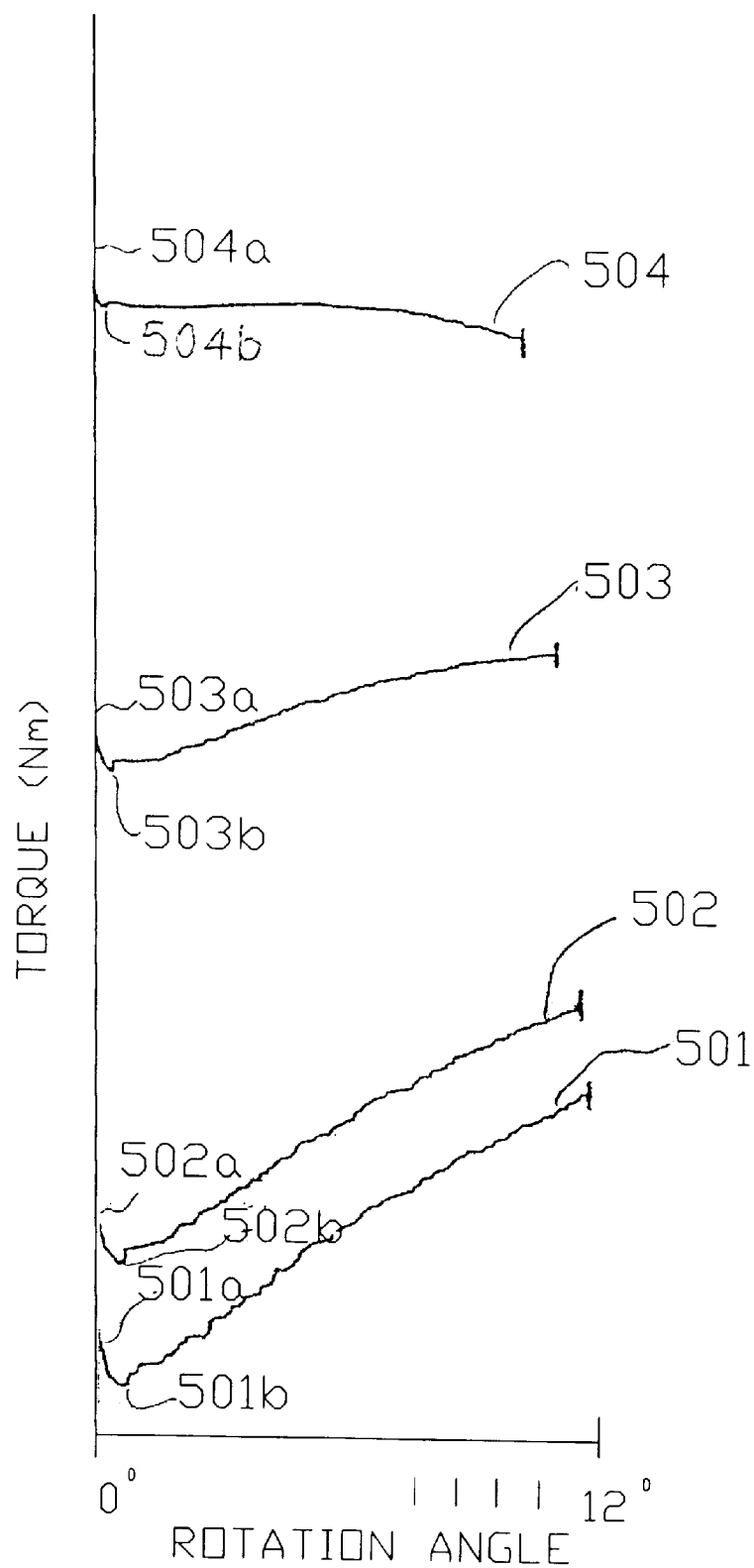
FIG. 5 is a diagram showing torque versus rotation angle for a single spring, with a respectively different spring angle for each curve.

FIG. 5 shows a plurality of curves 501–504 from a single spring 160. Each of the curves 501–504 corresponds to a respectively different spring angle. More specifically, curve 501 corresponds to the smallest spring angle, and curve 504 corresponds to the largest spring angle. Each curve 501–504 has a local maximum 501a–504a substantially at the breakaway point, corresponding to an angle of zero degrees. The angle between the breakaway point and the local maximum observed in testing was very small (so small in many trials as to be incapable of accurate measurement). As shown in curves 501–504, the torque falls off rapidly within the first one or two degrees of the rest position, because the magnetic force falls off rapidly to approximately zero as the arm 140 moves away from the rest position, much more rapidly than the spring force increases. Once the magnetic force reaches approximately zero, each curve reaches a local minimum at points 501b–504b; beyond that point, the increase in spring force with rotation of the arm 140 dominates, and the curves begin to increase again.

Curve 504 is approximately at the above-referenced "changeover point." At the changeover point, rotation of the arm 140 away from the rest position actually shortens the length of the spring 160, so that the torque required to rotate the tool 130 decreases, instead of increasing.

A magnet 150 is used in combination with the spring 160, to bias the arm 140 toward the rest position with an initial peak force. The bias force has a local maximum value when the arm 140 is rotated by a non-zero angle from the rest position. The spring tension in the rest position without the application of any external torque is selected so that a positive rotation of the tool 130 is required before the arm 140 is rotated away from the rest position. The stop 151 prevents the arm from rotating beyond the rest position.

An air control 122 is used to operate the actuator 120. The arm 140 is rotated away from the rest position using the tool 130 to be tested. No movement occurs apart from the rotation of the tool 130, until the sum of the force exerted by the springs 160 and the force exerted by the magnet 150 is exceeded. This creates a condition that more closely resembles that of a previously tightened fastener. After the threshold torque for movement is exceeded, the torque per degree of rotation is determined by the spring constant(s) and the angle of the springs 160. The tool 130 may be rotated by about 15 degrees to obtain the desired 2 to 6-degree rotation of the fastener.

The step of rotating may include moving the tool 130 manually or with an actuator 120. The actuator is used to establish the baseline tool and method performance without operator influence; manual operation with multiple operators presented is then used to establish the susceptibility of the tool and method to operator influence.

A torque exerted by the tool against the arm is measured using, for example, an in-line torque transducer 190. The angle the arm rotates through is measured using, for example, an angle potentiometer 180.

In testing of an exemplary fixture as shown in FIG. 1, the magnet's breakaway torque scatter was in the range of 0.69% and 1.66% of the mean peak torque with no springs. At higher torques, the magnet's torque scatter as a percentage of the mean peak torque would be even lower, 0.37% to 0.74%.

The torque scatter of the exemplary automated fixture was less than 3% of the mean in the required range of torque. It was as low as 0.45% at higher torques (i.e., tighter springs), and as high as 2.97% at lower torques (i.e., looser springs). The fixture simulates a joint with a low enough torque scatter to reveal the auditing performance of wrenches. A 0.45% torque scatter at high torque, high joint rate would mean that all of the torque values would be within +/−0.4 Nm. Almost all of the values at high torque would be within +/−0.2 Nm. A 3% torque scatter at low torque, low joint rate would mean that all the torque values would be within +/−0.9 Nm. Almost of the values would fall within +/−0.45 Nm.

The tests show that it is preferable to run consecutive data points on a single wrench close in time and without changing the set-up of the fixture. In other words, it is preferred to take all 25–30 audits at one time, one after the other. Using the automated function of the fixture reduces the fixture's potential sensitivity to audit speeds and other operator induced errors. In addition, a quick and direct comparison of wrenches is possible if the set-up is not changed for the next test wrench. However, this is not always possible. As a point of reference, it is also preferable to collect data on the fixture scatter itself for each wrench test and compare the performance of the fixture during the tests of the wrenches being compared. This, in effect, would qualify the results of the wrench audit performance test.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A test apparatus for simulating the behavior of a pre-tightened threaded joint, comprising:

a base;

a torque sensor that outputs an indication of torque when rotated by a tool to be tested;

a rotatable arm connected to the torque sensor and having a rest position;

a stop disposed between the base and the rotatable arm that prevents the rotatable arm from rotating past the rest position in a first direction, at least one of the group consisting of the rotatable arm and the stop including a magnet, the magnet causing a magnetic force that attracts the rotatable arm in the first direction toward the rest position when the rotatable arm is at or near the rest position; and at least one elastic member attached to the base and the rotatable arm that urges the rotatable arm in the first direction toward the rest position.

2. The test apparatus of claim 1, further comprising an actuator that moves the tool to be tested, to rotate the rotatable arm away from the rest position in a second direction opposite the first direction.

3. The test apparatus of claim 1, wherein the magnet is attached to the rotatable arm.

4. The test apparatus of claim 1, wherein:

the stop includes an additional arm to which the magnet is attached, the additional arm is attached to the rotatable arm, and the magnet meets the base when the rotatable arm is in the rest position.

5. The test apparatus of claim 1, further comprising a base, wherein:

the stop includes an additional arm attached to the base, the magnet is attached to either the rotatable arm or the additional arm, and the magnet is in contact with the rotatable arm and the additional arm when the rotatable arm is in the rest position.

6. The test apparatus of claim 1, further comprising a potentiometer that measures an angle of rotation of the rotatable arm.

7. The test apparatus of claim 1, wherein the elastic member has an adjustment, by which an amount of pre-tension in the elastic member at the rest position is adjustable.

8. The test apparatus of claim 7, wherein the elastic member is connected to a movable shaft, such that a length of the elastic member is measurable by determining the position of the shaft.

9. The test apparatus of claim 1, wherein the at least one elastic member includes at least one spring.

10. A test apparatus for simulating the behavior of a pre-tightened threaded joint, comprising:

a base;

a torque sensor that outputs an indication of torque when rotated by a tool to be tested;

a rotatable arm connected to the torque sensor and having a rest position;

means disposed between the base and the rotatable arm for preventing the rotatable arm from rotating past the rest position in a first direction, biasing means for applying an adjustable bias force to urge the rotatable arm in the first direction toward the rest position, the bias force having a local maximum value when the rotatable arm is at or adjacent to the rest position.

11. A method for testing a tool, comprising the steps of:

(a) attaching a tool to be tested to a rotatable arm having a rest position beyond which the rotatable arm does not move in a first direction;

(b) selecting a bias force function, the bias force function having a non-zero value when the rotatable arm is at the rest position, the bias force function varying with the position of the rotatable arm;

(c) applying a bias force to urge the rotatable arm in the first direction toward a rest position, the bias force function having a local maximum value when the rotatable arm is at or adjacent to the rest position;

(d) rotating the rotatable arm away from the rest position in a second direction opposite the first direction using the tool to be tested; and (e) measuring a torque exerted by the tool against the rotatable arm.

12. The method of claim 11, wherein step (c) includes pre-tensioning a is spring coupled to the rotatable arm, so that the spring is in tension when the rotatable arm is in the rest position.

13. The method of claim 11, wherein step (c) includes using a magnet to form the local maximum value of the bias force function.

14. The method of claim 11, further comprising measuring an angle of rotation of the rotatable arm.

15. The method of claim 11, further comprising:

performing steps (b) to (e) for a plurality of trials, wherein a respectively different bias force function is selected each time step (b) is performed.

16. The method of claim 15, wherein the bias force function has a zero-rotation bias force value, and a respectively different zero-rotation bias force value is selected each time step (b) is performed.

17. The method of claim 15, wherein the bias force is applied by a spring, and a respectively different spring having a respectively different spring constant is selected each time step (b) is performed.

18. The method of claim 11, further comprising performing steps (b) to (e) for a plurality of trials, wherein a respectively different human operator performs each trial.

19. The method of claim 11, further comprising performing steps (b) to (e) for a plurality of trials, wherein a respectively different rotation rate is used each time step (d) is performed.

20. The method of claim 11, wherein step (d) includes controlling rotation with an adjustable speed actuator.

21. The method of claim 11, wherein step (e) includes collecting at least one of the group consisting of torque and angle data with an electronic data acquisition system.

22. The method of claim 21, wherein step (e) further includes collecting a length of time in which the rotatable arm is rotated as a further test variable.

23. The method of claim 22, further comprising calculating a measure of repeatability and reproducibility of test results for the tool based on the data collected by the electronic data acquisition system.

* * * * *

UNITED STATES PATENT AND TRADEMARK OFFICE
CERTIFICATE OF CORRECTION

PATENT NO.    : 6,609,407 B1
DATED         : August 26, 2003
INVENTOR(S)   : Angelo Tambini It is certified that error appears in the above-identified patent and that said Letters Patent is hereby corrected as shown below:

<u>Column 10,</u>
Line 26, delete "is".
Line 54, delete "claim 11" and insert -- claim 19 -- therefor.

Signed and Sealed this

Sixteenth Day of December, 2003

JAMES E. ROGAN
*Director of the United States Patent and Trademark Office*